United States Patent
Morris et al.

(10) Patent No.: US 9,388,838 B2
(45) Date of Patent: Jul. 12, 2016

(54) ELASTIC RETAINING ASSEMBLY FOR MATABLE COMPONENTS AND METHOD OF ASSEMBLING

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US); Joel Colombo, Howell, MI (US); Toure D. Lee, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 13/856,888

(22) Filed: Apr. 4, 2013

(65) Prior Publication Data

US 2014/0298640 A1 Oct. 9, 2014

(51) Int. Cl.
| | | |
|---|---|---|
| F16B 19/00 | (2006.01) | |
| B21J 15/02 | (2006.01) | |
| F16B 19/06 | (2006.01) | |
| B21K 25/00 | (2006.01) | |
| B21J 15/00 | (2006.01) | |
| F16B 5/06 | (2006.01) | |
| F16B 5/07 | (2006.01) | |

(52) U.S. Cl.
CPC ............... *F16B 19/002* (2013.01); *B21J 15/00* (2013.01); *B21J 15/02* (2013.01); *B21K 25/00* (2013.01); *F16B 5/0635* (2013.01); *F16B 5/07* (2013.01); *F16B 19/06* (2013.01); *Y10T 29/49956* (2015.01)

(58) Field of Classification Search
None
See application file for complete search history.

(56) References Cited

U.S. PATENT DOCUMENTS

| | | | |
|---|---|---|---|
| 1,219,398 | A | 3/1917 | Huntsman |
| 1,261,036 | A | 4/1918 | Kerns |
| 1,301,302 | A | 4/1919 | Nolan |
| 1,556,233 | A | 10/1925 | Maise |
| 1,819,126 | A | 8/1931 | Scheibe |
| 1,929,848 | A | 10/1933 | Neely |
| 1,968,168 | A | 7/1934 | Place |
| 1,982,076 | A | 11/1934 | Spahn |

(Continued)

FOREIGN PATENT DOCUMENTS

| | | |
|---|---|---|
| BE | 842302 A | 9/1976 |
| CN | 1036250 A | 10/1989 |

(Continued)

OTHER PUBLICATIONS

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

*Primary Examiner* — Victor MacArthur
(74) *Attorney, Agent, or Firm* — Cantor Colburn LLP

(57) ABSTRACT

An elastic retaining assembly for matable components includes a first component having a first surface. Also included is a second component having a second surface and a third surface, wherein the second component is configured to be mated with the first component. Further included is a receiving feature formed proximate an engagement side of the second component and defining a pin perimeter surface. Yet further included is an elastically deformable pin operatively coupled to, and extending away from, the first surface, wherein the elastically deformable pin is formed of an elastically deformable material to elastically deform proximate the pin perimeter surface upon contact with the receiving feature.

13 Claims, 4 Drawing Sheets

(56) References Cited

U.S. PATENT DOCUMENTS

| | | |
|---|---|---|
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,862,040 A | 11/1958 | Curran |
| 2,902,902 A | 9/1959 | Slone |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,643,968 A | 2/1972 | Horvath |
| 3,680,272 A | 8/1972 | Meyer |
| 3,800,369 A | 4/1974 | Nikolits |
| 3,841,044 A | 10/1974 | Brown |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyl |
| 3,905,570 A | 9/1975 | Nieuwveld |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,300,851 A | 11/1981 | Thelander |
| 4,313,609 A | 2/1982 | Clements |
| 4,318,208 A | 3/1982 | Borja |
| 4,325,574 A | 4/1982 | Umemoto et al. |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,477,142 A | 10/1984 | Cooper |
| 4,481,160 A | 11/1984 | Bree |
| 4,527,760 A | 7/1985 | Salacuse |
| 4,575,060 A | 3/1986 | Kitagawa |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,745,656 A | 5/1988 | Revlett |
| 4,757,655 A | 7/1988 | Nentoft |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,843,975 A | 7/1989 | Welsch |
| 4,865,502 A | 9/1989 | Maresch |
| 4,881,764 A | 11/1989 | Takahashi et al. |
| 4,973,212 A | 11/1990 | Jacobs |
| 4,977,648 A | 12/1990 | Eckerud |
| 5,005,265 A | 4/1991 | Muller |
| 5,039,267 A | 8/1991 | Wollar |
| 5,139,285 A | 8/1992 | Lasinski |
| 5,154,479 A | 10/1992 | Sautter, Jr. |
| 5,165,749 A | 11/1992 | Sheppard |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,297,322 A | 3/1994 | Kraus |
| 5,339,491 A | 8/1994 | Sims |
| 5,342,139 A | 8/1994 | Hoffman |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |
| 5,577,301 A | 11/1996 | Demaagd |
| 5,577,779 A | 11/1996 | Dangel |
| 5,580,204 A | 12/1996 | Hultman |
| 5,586,372 A | 12/1996 | Eguchi et al. |
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,657,516 A | 8/1997 | Berg et al. |
| 5,667,271 A | 9/1997 | Booth |
| 5,670,013 A | 9/1997 | Huang et al. |
| 5,698,276 A | 12/1997 | Mirabitur |
| 5,736,221 A | 4/1998 | Hardigg et al. |
| 5,765,942 A | 6/1998 | Shirai et al. |
| 5,775,860 A | 7/1998 | Meyer |
| 5,795,118 A | 8/1998 | Osada et al. |
| 5,797,170 A | 8/1998 | Akeno |
| 5,797,714 A | 8/1998 | Oddenino |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,934,729 A | 8/1999 | Baack |
| 5,941,673 A | 8/1999 | Hayakawa et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,209,175 B1 | 4/2001 | Gershenson |

(56) References Cited

U.S. PATENT DOCUMENTS

| | | | |
|---|---|---|---|
| 6,209,178 B1 | 4/2001 | Wiese et al. |
| 6,254,304 B1 | 7/2001 | Takizawa et al. |
| 6,264,869 B1 | 7/2001 | Notarpietro et al. |
| 6,299,478 B1 | 10/2001 | Jones et al. |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,815 B1 | 3/2002 | Svihla et al. |
| 6,378,931 B1 | 4/2002 | Kolluri et al. |
| 6,398,449 B1 | 6/2002 | Loh |
| 6,484,370 B2 | 11/2002 | Kanie et al. |
| 6,485,241 B1 | 11/2002 | Oxford |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 * | 6/2004 | Culpepper .................. 403/13 |
| 6,757,942 B2 | 7/2004 | Matsui |
| 6,799,758 B2 | 10/2004 | Fries |
| 6,821,091 B2 | 11/2004 | Lee |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,172,210 B2 | 2/2007 | Yokota |
| 7,178,855 B2 | 2/2007 | Catron et al. |
| 7,198,315 B2 | 4/2007 | Cass et al. |
| 7,234,852 B2 | 6/2007 | Nishizawa et al. |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 * | 11/2008 | Yi et al. .................. 385/52 |
| 7,487,884 B2 | 2/2009 | Kim |
| 7,493,716 B2 | 2/2009 | Brown |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi |
| 7,793,998 B2 | 9/2010 | Matsui et al. |
| 7,802,831 B2 | 9/2010 | Isayama et al. |
| 7,828,372 B2 | 11/2010 | Ellison |
| 7,862,272 B2 | 1/2011 | Nakajima |
| 7,869,003 B2 * | 1/2011 | Van Doren et al. .......... 355/75 |
| 7,883,137 B2 | 2/2011 | Bar |
| 7,922,415 B2 | 4/2011 | Rudduck et al. |
| 7,946,684 B2 * | 5/2011 | Drury et al. .................. 347/49 |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,228,640 B2 | 7/2012 | Woodhead et al. |
| 8,249,679 B2 | 8/2012 | Cui |
| 8,261,581 B2 | 9/2012 | Cerruti et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,371,788 B2 | 2/2013 | Lange |
| 8,414,048 B1 | 4/2013 | Kwolek |
| 8,444,199 B2 | 5/2013 | Takeuchi et al. |
| 8,572,818 B2 | 11/2013 | Hofmann |
| 8,619,504 B2 | 12/2013 | Wyssbrod |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 2001/0030414 A1 | 10/2001 | Yokota |
| 2001/0045757 A1 | 11/2001 | Hideki et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |

(56) References Cited

U.S. PATENT DOCUMENTS

| | | |
|---|---|---|
| 2005/0156410 A1 | 7/2005 | Yokota |
| 2005/0156416 A1 | 7/2005 | Yokota |
| 2005/0244250 A1 | 11/2005 | Okada et al. |
| 2006/0092653 A1 | 5/2006 | Tachiiwa et al. |
| 2006/0102214 A1 | 5/2006 | Clemons |
| 2006/0110109 A1 | 5/2006 | Yu |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0274777 A1 | 11/2007 | Winkler |
| 2007/0292205 A1 | 12/2007 | Duval |
| 2008/0014508 A1* | 1/2008 | Van Doren et al. ............... 430/5 |
| 2008/0018128 A1 | 1/2008 | Yamagiwa et al. |
| 2008/0073888 A1 | 3/2008 | Enriquez |
| 2008/0094447 A1* | 4/2008 | Drury et al. ............... 347/49 |
| 2008/0128346 A1 | 6/2008 | Bowers |
| 2008/0217796 A1 | 9/2008 | Van Bruggen et al. |
| 2008/0260488 A1 | 10/2008 | Scroggie et al. |
| 2009/0028506 A1* | 1/2009 | Yi et al. ............... 385/52 |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0141449 A1 | 6/2009 | Yeh |
| 2009/0174207 A1 | 7/2009 | Lota |
| 2009/0243172 A1 | 10/2009 | Ting et al. |
| 2009/0265896 A1 | 10/2009 | Beak |
| 2009/0309388 A1 | 12/2009 | Ellison |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton |
| 2010/0134128 A1* | 6/2010 | Hobbs ............... 324/758 |
| 2010/0147355 A1* | 6/2010 | Shimizu et al. ............... 136/244 |
| 2010/0232171 A1 | 9/2010 | Cannon |
| 2010/0247034 A1* | 9/2010 | Yi et al. ............... 385/14 |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2013/0019454 A1 | 1/2013 | Colombo et al. |
| 2013/0019455 A1* | 1/2013 | Morris ............... 29/466 |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0157578 A1 | 6/2014 | Morris |
| 2014/0175774 A1 | 6/2014 | Kansteiner |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0264206 A1 | 9/2014 | Morris |
| 2014/0298638 A1 | 10/2014 | Colombo et al. |
| 2014/0298962 A1 | 10/2014 | Morris et al. |
| 2014/0301103 A1 | 10/2014 | Colombo et al. |
| 2014/0301777 A1 | 10/2014 | Morris et al. |
| 2015/0069779 A1 | 3/2015 | Morris et al. |

FOREIGN PATENT DOCUMENTS

| | | |
|---|---|---|
| CN | 1129162 A | 8/1996 |
| CN | 2285844 Y | 7/1998 |
| CN | 1205285 A | 1/1999 |
| CN | 1328521 A | 12/2001 |
| CN | 1426872 A | 7/2003 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 1933747 A | 3/2007 |
| CN | 2888807 Y | 4/2007 |
| CN | 1961157 A | 5/2007 |
| CN | 2915389 Y | 6/2007 |
| CN | 101250964 A | 4/2008 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202079532 U | 12/2011 |
| CN | 102313952 A | 1/2012 |
| CN | 202132326 U | 2/2012 |
| CN | 102756633 | 10/2012 |
| CN | 102803753 A | 11/2012 |
| CN | 102869891 A | 1/2013 |
| CN | 202686206 U | 1/2013 |
| CN | 102939022 A | 2/2013 |
| CN | 202987018 U | 6/2013 |

(56) References Cited

FOREIGN PATENT DOCUMENTS

| | | |
|---|---|---|
| CN | 103201525 A | 7/2013 |
| DE | 1220673 B | 7/1966 |
| DE | 2736012 A1 | 2/1978 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10234253 B3 | 4/2004 |
| DE | 102008005618 A1 | 7/2009 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 2281950 A | 3/1995 |
| JP | 2000010514 A | 1/2000 |
| JP | 2001141154 A | 5/2001 |
| JP | 2001171554 A | 6/2001 |
| JP | 2005268004 | 9/2005 |
| JP | 2006205918 | 8/2006 |
| JP | 2008307938 A * | 12/2008 |
| JP | 2009084844 | 4/2009 |
| JP | 2009187789 A | 8/2009 |
| JP | 2011085174 A | 4/2011 |
| JP | 2012060791 A | 3/2012 |
| JP | 2012112533 A | 6/2012 |
| KR | 20030000251 A1 | 1/2003 |
| WO | 9602963 A1 | 2/1996 |
| WO | 0055517 A2 | 3/2000 |
| WO | 0132454 A3 | 11/2001 |
| WO | 2004010011 | 1/2004 |
| WO | 2008140659 A1 | 11/2008 |
| WO | 2010105354 A1 | 9/2010 |
| WO | 2011025606 | 3/2011 |
| WO | 2013088447 A1 | 6/2013 |
| WO | 2013191622 A1 | 12/2013 |

* cited by examiner

ELASTIC RETAINING ASSEMBLY FOR MATABLE COMPONENTS AND METHOD OF ASSEMBLING

FIELD OF THE INVENTION

The present invention relates to matable components, and more particularly to an elastic retaining assembly for matable components, as well as a method of assembling matable components.

BACKGROUND

Currently, components which are to be mated together in a manufacturing process are subject to positional variation based on the mating arrangements between the components. One common arrangement includes components mutually located with respect to each other by 2-way and/or 4-way male alignment features; typically undersized structures which are received into corresponding oversized female alignment features such as apertures in the form of openings and/or slots. Alternatively, double-sided tape, adhesives or welding processes may be employed to mate parts. Irrespective of the precise mating arrangement, there is a clearance between at least a portion of the alignment features which is predetermined to match anticipated size and positional variation tolerances of the mating features as a result of manufacturing (or fabrication) variances. As a result, occurrence of significant positional variations between the mated components is possible, which may contribute to the presence of undesirably large and varying gaps and otherwise poor fit. The clearance between the aligning and attaching features may lead to relative motion between mated components, which contribute to poor perceived quality. Additional undesirable effects may include squeaking and rattling of the mated components, for example.

SUMMARY OF THE INVENTION

In one exemplary embodiment, an elastic retaining assembly for matable components includes a first component having a first surface. Also included is a second component having a second surface and a third surface, wherein the second component is configured to be mated with the first component. Further included is a receiving feature formed proximate an engagement side of the second component and defining a pin perimeter surface. Yet further included is an elastically deformable pin operatively coupled to, and extending away from, the first surface, wherein the elastically deformable pin is formed of an elastically deformable material and configured to elastically deform proximate the pin perimeter surface upon contact with the receiving feature.

In another exemplary embodiment, a method of assembling matable components is provided. The method includes inserting an elastically deformable pin of a first component into a receiving feature of a second component, wherein the elastically deformable pin comprises a pin perimeter and the receiving feature comprises a receiving feature perimeter. The method also includes contacting a pin perimeter surface of the elastically deformable pin with the receiving feature to impose a contact interference condition between the first component and the second component. The method further includes elastically deforming the elastically deformable pin proximate the pin perimeter surface upon contacting the receiving feature.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
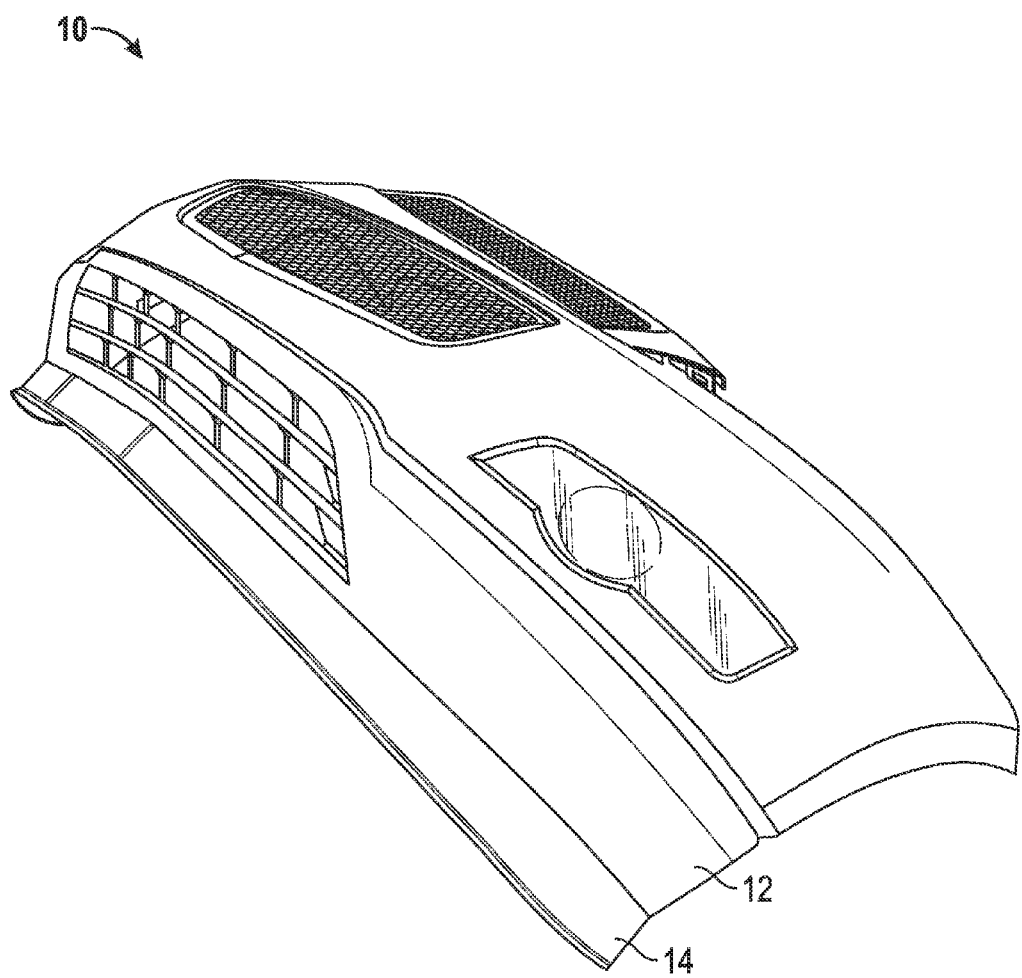
FIG. 1 is a perspective view of a portion of a front end of a vehicle.
Figure 2:
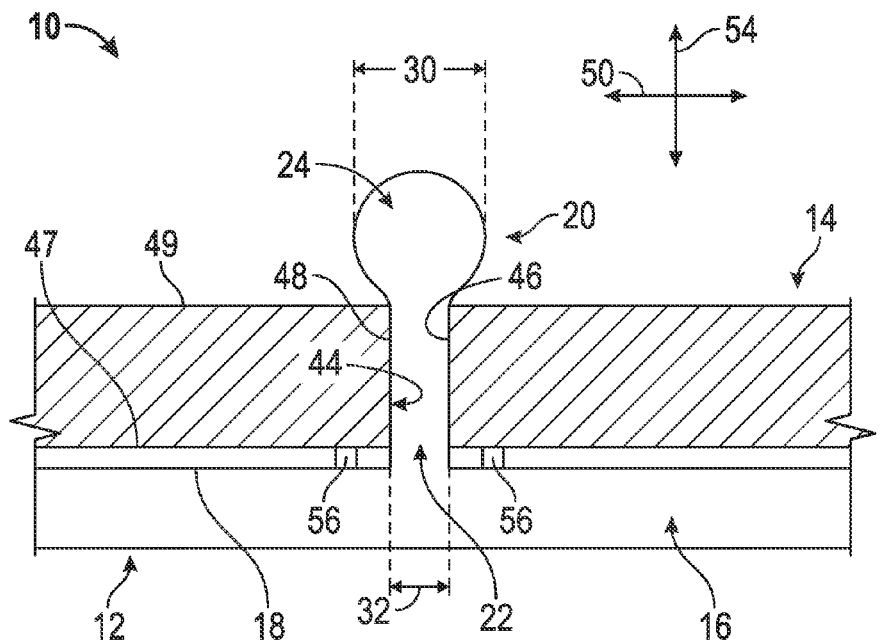
FIG. 2 is a side elevational view of an elastic retaining assembly.
Figure 3:
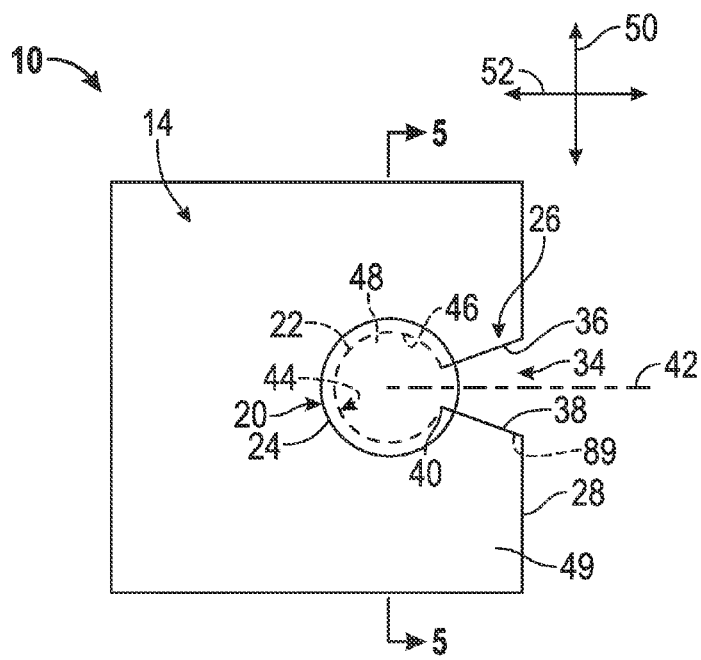
FIG. 3 is a top plan view of the elastic retaining assembly of FIG. 2.

Referring to FIGS. 1-3, an elastic retaining assembly 10 is illustrated. The elastic retaining assembly 10 comprises matable components, such as a first component 12 and a second component 14 that are configured to be mated and aligned with respect to each other. In one embodiment, the elastic retaining assembly 10 is employed in a vehicle application. However, it is to be understood that the components may be associated with numerous other applications and industries, such as home appliance and aerospace applications, for example. In an exemplary embodiment such as the aforementioned vehicle application, the first component 12 comprises an automotive fascia and the second component 14 comprises an automotive spoiler.

Although illustrated in a specific geometry, the first component 12 and the second component 14 may be configured in countless geometries. Regardless of the precise geometry of the first component 12 and the second component 14, the first component 12 is configured to align and fittingly mate with the second component 14, which will be described in detail below. In an alternative embodiment, rather than two components comprising the elastic retaining assembly 10, additional or intermediate layers or components may be included. It is to be appreciated that the elastic retaining assembly 10 is to be employed for providing a self-aligning relationship between components, such as the first component 12 and the second component 14, to each other, while also assisting in securely mating the components to each other. It is also to be understood that this embodiment could be used along a singular side or a specific location while other elastically averaged features could be utilized on an alternate side or location.

The first component 12 includes a main portion 16 having a first surface 18 that is typically a substantially planar surface. The first component 12 also includes an elastically deformable pin 20 extending from the main portion 16 in a direction relatively orthogonal from a plane that the first surface 18 is disposed in. The elastically deformable pin 20 is operatively coupled to the main portion 16 and may be integrally formed with the main portion 16. The elastically deformable pin 20 includes a pin portion 22 and a head portion 24. The second component 14 includes a receiving feature 26 extending inwardly from an engagement side 28 as a cutout portion that is configured to engage and receive the elastically deformable pin 20 upon mating of the first component 12 and the second component 14. Although a single elastically deformable pin and a single receiving feature are referenced, embodiments of the elastic retaining assembly 10 may include a plurality of elastically deformable pins and a plurality of receiving features, as will be described in detail below.

The elastically deformable pin 20 and the receiving feature 26 may be formed of numerous contemplated embodiments. In the exemplary embodiment, the pin portion 22 of the elastically deformable pin 20 is formed as a relatively tubular member and it is to be appreciated that the pin portion 22 may comprise a solid tubular member or a tubular member having a hollow portion. The head portion 24 of the elastically deformable pin 20 is formed of a bulbous structure that smoothly blends with the pin portion 22. The head portion 24 includes a maximum diameter 30 that is greater than a pin width 32 of the pin portion 22.

The receiving feature 26 comprises a notched cutout that includes a slot portion 34 that extends inwardly from the engagement side 28 and is defined by a first edge 36 and a second edge 38. The first edge 36 and the second edge 38 each extend from the engagement side 28 to a neck region 40. As the first edge 36 and the second edge 38 extend inwardly from the engagement side 28 toward the neck region 40, each is angled inwardly toward each other, as well as toward axis 42. The receiving feature 26 also includes a pin retaining portion 44 that is disposed at a position of the second component 14 that is radially inward of the slot portion 34 at a location immediately adjacent the neck region 40. The pin retaining portion 44 is defined by a pin retaining portion surface 46 (also may be referred to as a receiving feature perimeter surface) that geometrically corresponds substantially to the pin portion 22 of the elastically deformable pin 20. The receiving feature 26 effectively forms an opening extending through the second component 14 from a second surface 47 to a third surface 49.

As will be apparent from the description herein, the elastically deformable nature of the pins, in combination with the particular orientations described above, facilitates precise alignment of the first component 12 relative to the second component 14 by accounting for positional variation of the retaining and/or locating features of the first component 12 and the second component 14 inherently present due to manufacturing processes. The self-aligning benefits associated with the elastic retaining assembly 10 will be described in detail below.

The elastically deformable pin 20 of the first component 12 is positioned and engaged with the receiving feature 26 of the second component 14 upon translation of the first component 12 toward the second component 14 (or vice versa). In this way, the first component 12 is press fit into the second component 14 upon engagement of the elastically deformable pin 20 with the receiving feature 26. More particularly, a pin perimeter surface 48 of the pin portion 22 engages the first edge 36 and the second edge 38 at a location between the engagement side 28 and the neck region 40 (i.e., within the slot portion 34). Subsequent translation results in an elastic deformation of the pin portion 22. Specifically, the neck region 40 includes a neck width that is smaller than the pin width 32, thereby ensuring contact between the pin portion 22 and the receiving feature 26. Elastic deformation of the pin portion 22 may be further facilitated by embodiments comprising a hollow pin portion 22. The void of material proximate the hollow portion enhances the flexibility of the pin portion 22. Regardless of whether the pin portion 22 is solid or hollow, the pin portion 22 is further translated through the neck region 40 and into the pin retaining portion 44.

Any suitable elastically deformable material may be used for the elastically deformable pin 20. The term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Numerous examples of materials that may at least partially form the components include various metals, polymers, ceramics, inorganic materials or glasses, or composites of any of the aforementioned materials, or any other combinations thereof Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. An example of a suitable polymer includes acetal (e.g., POM). In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS), such as an ABS acrylic. The material may be in any form and formed or manufactured by any suitable process, including stamped or formed metal, composite or other sheets, forgings, extruded parts, pressed parts, castings, or molded parts and the like, to include the deformable features described herein. The material, or materials, may be selected to provide a predetermined elastic response characteristic of the elastically deformable pin 20. The predetermined elastic response characteristic may include, for example, a predetermined elastic modulus and/or coefficient of friction.

The precise position where engagement between the pin portion perimeter surface 48 and the receiving feature 26 occurs will vary depending on positional variance imposed by manufacturing factors. Due to the elastically deformable properties of the elastic material comprising the elastically deformable pin 20, the criticality of the initial location of engagement is reduced. Further insertion of the elastically deformable pin 20 into the receiving feature 26 ultimately leads to a fully engaged position of the elastically deformable pin 20. In the fully engaged position, a tight, fitted engagement between the elastically deformable pin 20 and the receiving feature 26 is achieved by contact interface between the pin portion perimeter surface 48 and the retaining portion surface 46. Such a condition is ensured by sizing a pin perimeter to be larger than a retaining feature perimeter. The interference between the pin portion 22 and the retaining portion surface 46 causes elastic deformation proximate pin portion perimeter surface 48. The malleability of the materials reduces issues associated with positional variance. More particularly, in contrast to a rigid insert that typically results in gaps between the insert and receiving structure at portions around the perimeter of the insert, the elastically deformable pin 20 advantageously deforms to maintain alignment of the first component 12 and the second component 14, while also reducing or eliminating gaps associated with manufacturing challenges. The assembly also advantageously reduces the number of mechanical fasteners, such as threaded fasteners required for attachment of the components, thereby reducing cost and component degradation.

Elastic deformation of the pin portion 22 may also occur as a bending deformation to further enhance the elastic averaging between the mating components. As with compression of the pin portion 22, as described above, and stretching of the pin portion 22, as described in detail below, bending of the pin portion 22 accounts for positional variation and provides elastic averaging by allowing compliance in directions requiring bending of the pin portion 22.

Figure 4:
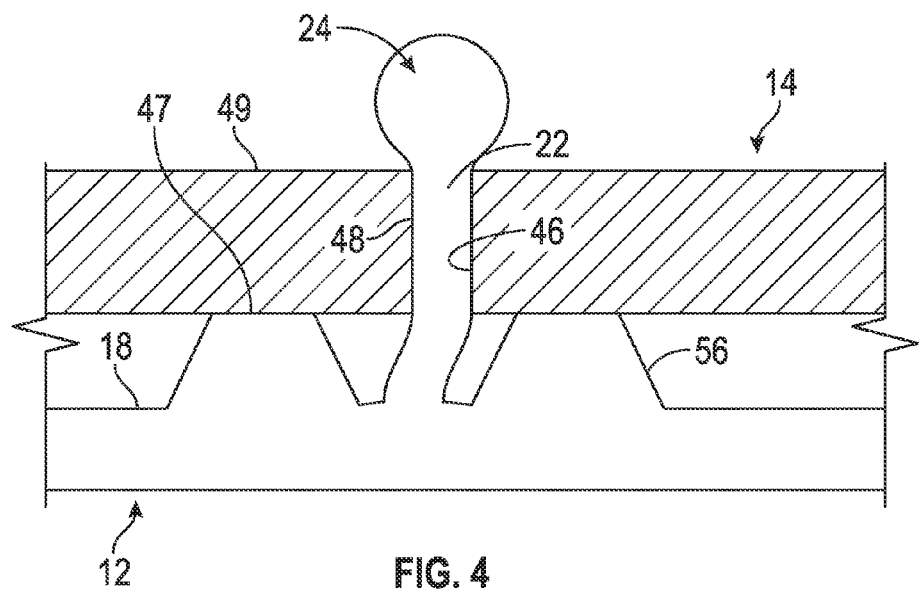
FIG. 4 is a partial, cross-sectional view of another embodiment of the elastic retaining assembly.
Figure 5:
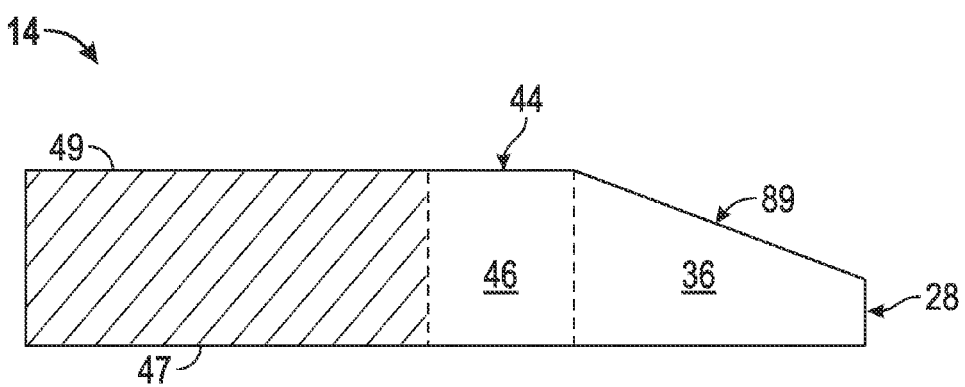
FIG. 5 is a cross-sectional view taken along line 5-5 of FIG. 3 of a lead-in portion of a second component of the elastic retaining assembly.

Referring to FIGS. 2-4, in addition to retaining the second component 14 in a first direction 50 and a second direction 52 upon contact interference between the pin portion 22 of the elastically deformable pin 20 with the receiving feature perimeter surface 46, in a fully engaged position, the second component 14 is retained in a third direction 54. Retaining in the third direction 54 is achieved by imposing a contact interference condition between the head portion 24 of the elastically deformable pin 20 and the third surface 49 of the second component 14. A lead-in region 89 (FIG. 5) may be included to facilitate insertion of the head portion 24 proximate the third surface 49. Contact between the first surface 18 of the first component 12 and the second surface 47 of the second component 14 may be made by intermediate structural members, referred to as standoffs 56, operatively coupled to the first surface 18 and/or the second surface 47. Translation of the first component 12 toward and into the second component 14 results in contact with each other proximate the standoffs 56. The length of the pin portion 22 of the elastically deformable pin 20 is dimensioned to ensure engagement of the third surface 49 of the second component 14 with the head portion 24 of the first component 12 to achieve the contact interference referenced above. Specifically, the elastically deformable pin 20 is configured to elastically stretch during insertion. Upon engagement, the head portion 24 elastically deforms to achieve a tight, fitted engagement, as well as retaining of the second component 14 with respect to the third direction 54, thereby putting the elastically deformable pin 20 in a tension condition. In the stretched, tension condition, the pin portion 22 may deform proximate the standoffs 56, between the first surface 18 and the second surface 47. An example of this deformation is illustrated as an "S-shaped" curve portion that accounts for positional variation of the components (FIG. 4).

The first component 12 may include a plurality of elastically deformable pins 20, while the second component 14 may include a plurality of receiving features 34. The plurality of receiving features is positioned to correspondingly receive respective pins in a manner described in detail above. The elastic deformation of the plurality of elastically deformable pins elastically averages any positional errors of the first component 12 and the second component 14. In other words, gaps that would otherwise be present due to positional errors associated with portions or segments of the first component 12 and the second component 14, particularly locating and retaining features, are eliminated by offsetting the gaps with an over-constrained condition of other elastically deformable pins. Specifically, the positional variance of each pin and/or receiving feature is offset by the remaining pins to average in aggregate the positional variance of each pin. Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, the disclosure of which is incorporated by reference herein in its entirety. The embodiments disclosed above provide the ability to convert an existing component that is not compatible with the above-described elastic averaging principles to an assembly that does facilitate elastic averaging and the benefits associated therewith.

Figure 6:
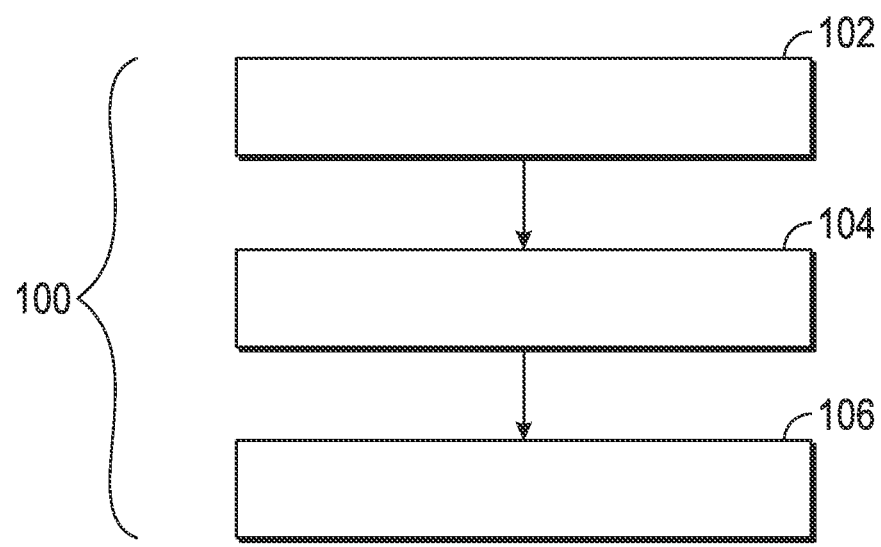
FIG. 6 is a flow diagram illustrating a method of assembling matable components.

A method 100 of assembling matable components is also provided, as illustrated in FIG. 6, and with reference to FIGS. 1-5. The elastic retaining assembly 10, and more specifically the elastically deformable nature of the elastically deformable pins 20, has been previously described and specific structural components need not be described in further detail. The method 100 includes inserting 102 the elastically deformable pin 20 into the receiving feature 26. The method 100 also includes contacting 104 the pin perimeter surface 48 with the receiving feature 26 to impose a contact interference condition between the first component 12 and the second component 14. The method 100 further includes elastically deforming 106 the elastically deformable pin 20 proximate the pin perimeter surface 48 upon contacting 104 the receiving feature 26.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastic retaining assembly for matable components comprising:
a first component having a first surface, the first component comprising a fascia of an automobile;

a second component having a second surface and a third surface, wherein the second component is configured to be mated with the first component, the second component comprising a spoiler of the automobile;

a receiving feature formed proximate an engagement side of the second component and defining a pin perimeter surface; and an elastically deformable pin operatively coupled to, and extending away from, the first surface, wherein the elastically deformable pin is formed of an elastically deformable material and configured to elastically deform proximate the pin perimeter surface upon contact with the receiving feature, the elastically deformable pin comprises a pin portion and a head portion, the pin portion extending from the first surface to the head portion, the head portion being a spherical member having a diameter greater than a diameter of the pin perimeter surface of the receiving feature.

2. The elastic retaining assembly of claim 1, wherein the receiving feature comprises a notch extending inwardly from the engagement side.

3. The elastic retaining assembly of claim 1, wherein the receiving feature comprises a slot portion and a pin retaining portion.

4. The elastic retaining assembly of claim 3, wherein the slot portion is defined by a first edge and a second edge, and wherein the slot portion extends from the engagement side to a neck region.

5. The elastic retaining assembly of claim 4, wherein the first edge and the second edge each taper toward each other from the engagement side to the neck region.

6. The elastic retaining assembly of claim 4, wherein the elastically deformable pin comprises a pin width, and wherein the neck region comprises a neck width smaller than the pin width.

7. The elastic retaining assembly of claim 3, wherein the pin retaining portion comprises a receiving feature perimeter surface having a receiving feature perimeter geometry substantially corresponding to a pin geometry of the pin perimeter surface.

8. The elastic retaining assembly of claim 1, wherein the pin portion comprises a solid tubular member.

9. The elastic retaining assembly of claim 1, wherein the pin portion comprises a hollow tubular member.

10. The elastic retaining assembly of claim 1, wherein the head portion is disposed in contact interference with the receiving feature proximate the third surface of the second component, and wherein the pin portion is disposed in a stretched, elongated condition.

11. The elastic retaining assembly of claim 1, further comprising at least one standoff extending from at least one of the first surface of the first component and the second surface of the second component.

12. The elastic retaining assembly of claim 1, further comprising:

a plurality of elastically deformable pins operatively coupled to the first component, the elastically deformable pin being one of the plurality of elastically deformable pins; and a plurality of receiving features defined by the second component and configured to receive the plurality of elastically deformable pins, the receiving feature being one of the plurality of receiving features.

13. The elastic retaining assembly of claim 12, further comprising a fully engaged position of the first component, wherein the fully engaged position comprises contact interference between the pin perimeter surface of each of the plurality of elastically deformable pins and the receiving structure, wherein an amount of deformation of the plurality of elastically deformable pins is averaged in aggregate.

* * * * *